United States Patent
Narayanan et al.

(10) Patent No.: US 7,282,291 B2
(45) Date of Patent: Oct. 16, 2007

(54) WATER FREE PROTON CONDUCTING MEMBRANES BASED ON POLY-4-VINYLPYRIDINEBISULFATE FOR FUEL CELLS

(75) Inventors: Sekharipuram R. Narayanan, Altadena, CA (US); Shiao-Pin S. Yen, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 575 days.

(21) Appl. No.: 10/722,352

(22) Filed: Nov. 24, 2003

(65) Prior Publication Data

US 2004/0234834 A1    Nov. 25, 2004

Related U.S. Application Data

(60) Provisional application No. 60/429,030, filed on Nov. 25, 2002.

(51) Int. Cl.
*H01M 8/10*        (2006.01)
*C08J 5/22*        (2006.01)

(52) U.S. Cl. .................. 429/33; 429/307; 429/304; 429/12; 521/27

(58) Field of Classification Search .............. 429/33, 429/307, 304, 12; 521/27
See application file for complete search history.

(56) References Cited

U.S. PATENT DOCUMENTS

| | | | |
|---|---|---|---|
| 3,013,098 A | 12/1961 | Hunger et al. | |
| 3,113,049 A | 12/1963 | Worsham | |
| 3,143,440 A | 8/1964 | Hunger et al. | |
| 3,368,922 A | 2/1968 | Salyer | |
| 3,409,520 A | 11/1968 | Bolmer | |
| 3,410,780 A | 11/1968 | Holden | |
| 3,423,228 A | 1/1969 | Oster et al. | |
| 3,464,008 A | 8/1969 | Meysson et al. | |
| 3,480,520 A | 11/1969 | Smith | |
| 3,581,462 A | 6/1971 | Stump | |
| 3,644,263 A | * 2/1972 | Burke, Jr. ............ | 523/326 |
| 3,776,462 A | 12/1973 | Payne, Jr. et al. | |
| 3,899,354 A | 8/1975 | Kordesch | |
| 3,982,961 A | 9/1976 | Grasso | |

(Continued)

FOREIGN PATENT DOCUMENTS

DE     3110571     9/1982

(Continued)

OTHER PUBLICATIONS

Naryanan, et al., "Studies on the Electro-Oxidation of Methanol and Formaldehyde at Carbon-Supported Platinum and Platinum Alloy Electrodes", 1046b Extended Abstracts, Spring Meeting, Oct. 11-16, 1992, St. Louis Missouri, 92/2, pp. 78-79.

(Continued)

*Primary Examiner*—Raymond Alejandro
*Assistant Examiner*—Angela J. Martin
(74) *Attorney, Agent, or Firm*—Fish & Richardson P.C.

(57) ABSTRACT

Disclosed are methods for forming a water-free electrolyte membrane useful in fuel cells. Also provided is a water-free electrolyte membrane comprising a quaternized amine salt including poly-4-vinylpyridinebisulfate, a poly-4-vinylpyridinebisulfate silica composite, and a combination thereof and a fuel cell comprising the membrane.

13 Claims, 4 Drawing Sheets

U.S. PATENT DOCUMENTS

| | | |
|---|---|---|
| 3,993,985 A | 11/1976 | Chopard et al. |
| 4,003,705 A | 1/1977 | Buzza et al. |
| 4,011,149 A | 3/1977 | Nozik |
| 4,025,412 A | 5/1977 | LaConti |
| 4,085,709 A | 4/1978 | Tangri |
| 4,125,676 A | 11/1978 | Maricle et al. |
| 4,130,484 A | 12/1978 | Marwil et al. |
| 4,175,013 A | 11/1979 | Barnert et al. |
| 4,248,941 A | 2/1981 | Louis et al. |
| 4,257,856 A | 3/1981 | Beni et al. |
| 4,262,063 A | 4/1981 | Kudo et al. |
| 4,275,126 A | 6/1981 | Bergmann et al. |
| 4,341,608 A | 7/1982 | St. John |
| 4,349,613 A | 9/1982 | Winsel |
| 4,350,608 A | 9/1982 | Gestaut |
| 4,354,861 A | 10/1982 | Kalt |
| 4,365,008 A | 12/1982 | DeCasperis et al. |
| 4,390,603 A | 6/1983 | Kawana et al. |
| 4,395,322 A | 7/1983 | Harris |
| 4,407,905 A | 10/1983 | Takeuchi et al. |
| 4,419,209 A | 12/1983 | Klinkowski |
| 4,420,544 A | 12/1983 | Lawson et al. |
| 4,431,608 A | 2/1984 | Katagiri et al. |
| 4,465,570 A | 8/1984 | Oda et al. |
| 4,478,917 A | 10/1984 | Fujita et al. |
| 4,493,878 A | 1/1985 | Horiba et al. |
| 4,526,843 A | 7/1985 | Kaufman et al. |
| 4,537,840 A | 8/1985 | Tsukui et al. |
| 4,562,123 A | 12/1985 | Shimizu et al. |
| 4,575,410 A | 3/1986 | Neti |
| 4,588,661 A | 5/1986 | Kaufman et al. |
| 4,594,297 A | 6/1986 | Polak et al. |
| 4,596,858 A | 6/1986 | Gregor et al. |
| 4,605,685 A | 8/1986 | Momose et al. |
| 4,612,261 A | 9/1986 | Tsukui et al. |
| 4,629,664 A | 12/1986 | Tsukui et al. |
| 4,644,751 A | 2/1987 | Hsu |
| 4,659,559 A | 4/1987 | Struthers |
| 4,699,700 A | 10/1987 | Dhooge |
| 4,711,793 A * | 12/1987 | Ostreicher et al. .......... 427/244 |
| 4,711,907 A | 12/1987 | Sterzel et al. |
| 4,728,533 A | 3/1988 | Feigenbaum et al. |
| 4,729,930 A | 3/1988 | Beal et al. |
| 4,729,931 A | 3/1988 | Grimble |
| 4,738,903 A | 4/1988 | Garow et al. |
| 4,744,954 A | 5/1988 | Campbell et al. |
| 4,745,953 A | 5/1988 | Kobayashi et al. |
| 4,752,361 A | 6/1988 | Gautschi |
| 4,766,043 A | 8/1988 | Shirogami et al. |
| 4,810,597 A | 3/1989 | Kumagai et al. |
| 4,824,739 A | 4/1989 | Breault et al. |
| 4,828,941 A | 5/1989 | Sterzel |
| 4,875,900 A | 10/1989 | Singh et al. |
| 4,876,115 A | 10/1989 | Raistrick |
| 4,882,232 A | 11/1989 | Bugnet et al. |
| 4,985,315 A | 1/1991 | Lemoine |
| 5,013,618 A | 5/1991 | Luczak |
| 5,013,765 A | 5/1991 | Sluma et al. |
| 5,019,263 A | 5/1991 | Haag et al. |
| 5,037,518 A | 8/1991 | Young et al. |
| 5,047,299 A | 9/1991 | Shockling |
| 5,049,275 A | 9/1991 | Gillberg-LaForce et al. |
| 5,084,144 A | 1/1992 | Reddy et al. |
| 5,118,398 A | 6/1992 | McElroy et al. |
| 5,141,823 A | 8/1992 | Wright et al. |
| 5,151,166 A | 9/1992 | Harral et al. |
| 5,164,060 A | 11/1992 | Eisman et al. |
| 5,169,730 A | 12/1992 | Reichner et al. |
| 5,173,166 A | 12/1992 | Tomantschger et al. |
| 5,176,809 A | 1/1993 | Simuni |
| 5,186,877 A | 2/1993 | Watanabe |
| 5,225,391 A | 7/1993 | Stonehart et al. |
| 5,236,687 A | 8/1993 | Fukuda et al. |
| 5,242,764 A | 9/1993 | Dhar |
| 5,250,184 A | 10/1993 | Maier |
| 5,252,410 A | 10/1993 | Wilkinson et al. |
| 5,260,143 A | 11/1993 | Voss et al. |
| 5,277,996 A | 1/1994 | Marchetti et al. |
| 5,294,232 A | 3/1994 | Sakairi et al. |
| 5,294,580 A | 3/1994 | Dufner |
| 5,308,465 A | 5/1994 | Hillrichs et al. |
| 5,316,871 A | 5/1994 | Swathirajan et al. |
| 5,322,602 A | 6/1994 | Razaq |
| 5,330,626 A | 7/1994 | Banerjee |
| 5,330,860 A | 7/1994 | Grot et al. |
| 5,335,628 A | 8/1994 | Dunbar |
| 5,344,548 A | 9/1994 | Alberti et al. |
| 5,366,821 A | 11/1994 | Merritt et al. |
| 5,394,852 A | 3/1995 | McAlister |
| 5,399,184 A | 3/1995 | Harada et al. |
| 5,401,589 A | 3/1995 | Palmer et al. |
| 5,415,888 A | 5/1995 | Banerjee et al. |
| 5,431,789 A | 7/1995 | Huber et al. |
| 5,432,023 A | 7/1995 | Yamada et al. |
| 5,436,086 A | 7/1995 | Seymour et al. |
| 5,436,094 A | 7/1995 | Horimoto et al. |
| 5,445,905 A | 8/1995 | Marsh et al. |
| 5,460,896 A | 10/1995 | Takada et al. |
| 5,468,574 A | 11/1995 | Ehrenberg et al. |
| 5,482,792 A | 1/1996 | Faita et al. |
| 5,512,152 A | 4/1996 | Schicht et al. |
| 5,513,600 A | 5/1996 | Teves |
| 5,518,830 A | 5/1996 | Worrell et al. |
| 5,523,177 A | 6/1996 | Kosek et al. |
| 5,527,631 A | 6/1996 | Singh et al. |
| 5,547,911 A | 8/1996 | Grot |
| 5,561,000 A | 10/1996 | Dirven et al. |
| 5,573,648 A | 11/1996 | Shen et al. |
| 5,576,115 A | 11/1996 | Capuano et al. |
| 5,582,632 A | 12/1996 | Nohr et al. |
| 5,591,545 A | 1/1997 | Miyashita et al. |
| 5,592,028 A | 1/1997 | Pritchard |
| 5,593,721 A | 1/1997 | Daidai et al. |
| 5,598,088 A | 1/1997 | Richter |
| 5,599,638 A | 2/1997 | Surampudi et al. |
| 5,599,639 A | 2/1997 | Sansone et al. |
| 5,599,640 A | 2/1997 | Lee et al. |
| 5,603,830 A | 2/1997 | Everhart et al. |
| 5,634,341 A | 6/1997 | Klanchar et al. |
| 5,641,586 A | 6/1997 | Wilson |
| 5,643,689 A | 7/1997 | Flesicher et al. |
| 5,645,950 A | 7/1997 | Benz et al. |
| 5,658,682 A | 8/1997 | Usuda et al. |
| 5,679,248 A | 10/1997 | Blaney |
| 5,679,482 A | 10/1997 | Ehrenberg et al. |
| 5,698,089 A | 12/1997 | Lewis et al. |
| 5,709,961 A | 1/1998 | Cisar et al. |
| 5,733,437 A | 3/1998 | Baker et al. |
| 5,750,013 A | 5/1998 | Lin |
| 5,766,799 A | 6/1998 | Hong |
| 5,773,162 A | 6/1998 | Surampudi et al. |
| 5,795,496 A | 8/1998 | Yen et al. |
| 5,800,938 A | 9/1998 | Watanabe |
| 5,814,995 A | 9/1998 | Tasdighi |
| 5,834,523 A | 11/1998 | Steck et al. |
| 5,840,172 A | 11/1998 | Zugravu |
| 5,851,689 A | 12/1998 | Chen |
| 5,858,569 A | 1/1999 | Meacher et al. |
| 5,863,672 A | 1/1999 | Ledjeff et al. |
| 5,897,766 A | 4/1999 | Kawatsu |
| 5,916,505 A | 6/1999 | Cisar et al. |
| 5,919,583 A | 7/1999 | Grot et al. |
| 5,925,477 A | 7/1999 | Ledjeff et al. |
| 5,928,807 A | 7/1999 | Elias |

| | | |
|---|---|---|
| 5,935,431 A | 8/1999 | Korin |
| 5,945,231 A | 8/1999 | Narayanan et al. |
| 5,952,118 A | 9/1999 | Ledjeff et al. |
| 5,998,057 A | 12/1999 | Koschany et al. |
| 6,001,507 A | 12/1999 | Ono et al. |
| 6,033,793 A | 3/2000 | Woods et al. |
| 6,045,772 A | 4/2000 | Szydlowski et al. |
| 6,054,228 A | 4/2000 | Cisar et al. |
| 6,059,943 A | 5/2000 | Murphy et al. |
| 6,136,463 A | 10/2000 | Kindler et al. |
| 6,146,781 A | 11/2000 | Surampudi et al. |
| 6,171,721 B1 | 1/2001 | Narayanan et al. |
| 6,214,485 B1 | 4/2001 | Barnett et al. |
| 6,221,523 B1 | 4/2001 | Chun et al. |
| 6,248,460 B1 | 6/2001 | Surampudi et al. |
| 6,254,748 B1 | 7/2001 | Surampudi et al. |
| 6,258,476 B1 | 7/2001 | Cipollini |
| 6,265,093 B1 | 7/2001 | Surampudi et al. |
| 6,274,260 B1 | 8/2001 | Schuler |
| 6,277,447 B1 | 8/2001 | Chun et al. |
| 6,299,744 B1 | 10/2001 | Narayanan et al. |
| 6,303,244 B1 | 10/2001 | Surampudi et al. |
| 6,306,285 B1 | 10/2001 | Narayanan et al. |
| 6,368,492 B1 | 4/2002 | Narayanan et al. |
| 6,391,486 B1 | 5/2002 | Narayanan et al. |
| 6,420,059 B1 | 7/2002 | Surampudi et al. |
| 6,432,284 B1 | 8/2002 | Narayanan et al. |
| 6,440,594 B1 | 8/2002 | Kindler et al. |
| 6,444,343 B1 | 9/2002 | Prakash et al. |
| 6,468,684 B1 | 10/2002 | Chisholm et al. |
| 6,479,178 B2 | 11/2002 | Barnett |
| 6,485,851 B1 | 11/2002 | Narayanan et al. |
| 6,533,919 B1 | 3/2003 | Narayanan et al. |
| 6,589,684 B1 | 7/2003 | Surampudi et al. |
| 6,680,139 B2 | 1/2004 | Narayanan et al. |
| 6,703,150 B2 | 3/2004 | Surampudi et al. |
| 2003/0148162 A1 | 8/2003 | Narayanan et al. |

FOREIGN PATENT DOCUMENTS

| | | |
|---|---|---|
| DE | 4243600 | 7/1993 |
| EP | 0241432 | 10/1987 |
| EP | 0248394 | 12/1987 |
| EP | 0546594 | 6/1993 |
| EP | 0716463 | 6/1996 |
| EP | 0629013 | 12/1996 |
| EP | 0818841 | 1/1998 |
| FR | 1436154 | 4/1966 |
| JP | 59209277 | 11/1984 |
| JP | 60151969 | 8/1985 |
| JP | 60165062 | 8/1985 |
| JP | 63-076264 | 4/1988 |
| JP | 64077876 | 3/1989 |
| JP | 02-051865 | 2/1990 |
| JP | 2148657 | 6/1990 |
| JP | 6188008 | 7/1994 |
| JP | 06251779 | 9/1994 |

OTHER PUBLICATIONS

Narayanan, et al., "Implications of Fuel Crossover in Direct Methanol Fuel Cells", 1046b Extended Abstracts, Fall Meting, Oct. 10-15, 1993, New Orleans, Louisiana, 93/2, pp. 126-127.

Zawodzinski, et al., "Methanol Cross-over in DMFC's: Development of Strategies for Minimization", 1046b Extended Abstracts, Spring Meeting, Oct. 9-14, 1994, St. Louis, Missouri, 94/2, p. 960.

Kosek, et al., "A Direct Methanol Oxidation Fuel Cell", Proceeding of the 28th Intersociety Energy Conversion Engineering Conference, vol. 1, Aug. 8, 1993, pp. 11209-11214.

Hamnett, et al., "Electrocatalysis and the Direct Methanol fuel Cell", *Chemistry and Industry*, No. 13, pp. 480-483, Jul. 6, 1992.

Skerrett, "Fuel Cell Update", *Popular Science*, pp. 88-91, pp. 120-121, Jun. 1993.

Watanabe, et al., "Applications of the Gas Diffusion Electrode to a Backward Fee and Exhaust (BFE) Type Methanol Anode", *J. Electroanal. Chem.*, vol. 199, pp. 311-322, 1986.

Watanabe, et al., "The use of thin films of sulphonated fluoropolymers for improvements in the activity and durability of Pt electrocatalysts for methanol electrooxidation", *J. Electroanal. Chem.*, vol. 284, pp. 511-515, 1990.

Hawley's Condensed Chemical Dictionary, Thirteenth Edition, 1997, entry of "pore", p. 910.

Poltarzewski, et al., "Nafion Distribution in Gas Diffusion Eleectrodes for Solid-Polymer-Electrolyte-Fuel-Cell Applications", *Journal of the Electrochemical Society*, vol. 139, No. 3, pp. 761-765, Mar. 1992.

Watanabe, "Improvement of the Performance and Durability of Anode for Direct Methanol Fuel Cells", Proceedings of the Workshop in Direct Methanol-Air Fuel Cells, vol. 92-14, pp. 24-36, 1992.

Narayanan, et al., "Recent Advanced in PEM Liquid-Feed Direct Methanol Fuel Cells", The Eleventh Annual Battery Conference on Applications and Advances, California State University, Long Beach, California, Jan. 9-12, 1996, pp. 113-122.

Narayanan, et al., "Studies on the Electro-Oxidation of Methanol and Formaldehyde at Carbon-Supported Platinum and Platinum Alloy Electrodes", The Electrochemical Society, Inc., Fall Meeting, Toronto, Ontario, Canada, Oct. 11-16, 1992, pp. 78-79.

Kawashima, et al., "Surface-Activated Amorphous Alloy Fuel Electrodes for Methanol Fuel Cell", *Science R eports of the Research Institutes*, Tohoku University, Series A: Physics, Chemistry, and Metallurgy, Sendai, Japan, vol. 31, No. 1, pp. 174-182, date not provided.

Merriam-Webster's Collegiate Dictionary, 10th Edition, p. 115, 1992, no month available.

Hawley's Condensed Chemical Dictionary, 11th Edition, Van Nostrand Reinhold, New York, NY, 1987.

Politova, et al., "Ethylene Hydrogenation in Electrochemical Cell With Solid Proton-Conducting Electrolyte", *Reaction Kinetics and Catalysis Letters*, vol. 41, No. 2, pp. 321-326, May 1990.

Haile, et al., "Superprotonic conductivity in $Cs_3 (HSO_4)_2(H_2PO_4)$", *Solid State Ionics*, vol. 22, pp. 128-134, 1995.

Haile, "Hydrogen-Bonding and Phase Transitions in Proton-Conducting Solid Acids", *Materials Research Society Symposium Proceedings*, vol. 547, pp. 315-326, Nov. 30-Dec. 4, 1998, Boston, Massachusetts, USA.

Mhiri, "Hydrogen bonding in $Cs_{1-x}M_xHSO_4$ protonic conductors", *Solid State Ionics*, vol. 61, pp. 187-191, May 1993.

Zaidi, et al., "Solid Polymer Composite Electrolytes for PEMFC", *33rd Intersociety Engineering Conference on Energy Conversion*, Aug. 2-6, 1998, Colorado Springs, Colorado, USA.

* cited by examiner

WATER FREE PROTON CONDUCTING MEMBRANES BASED ON POLY-4-VINYLPYRIDINEBISULFATE FOR FUEL CELLS

CROSS REFERENCE TO RELATED APPLICATIONS

The invention claims priority under 35 U.S.C. §119 to provisional application Ser. No. 60/429,030, filed Nov. 25, 2002, the disclosure of which is incorporated herein by reference.

STATEMENT REGARDING FEDERALLY SPONSORED RESEARCH

The invention was funded in part by Grant No. NAS7-1407 awarded by NASA. The government may have certain rights in the invention.

TECHNICAL FIELD

This invention relates to fuel cells, and more particularly to electrolyte membranes for use in fuel cells.

BACKGROUND

Transportation vehicles, which operate on gasoline-powered internal combustion engines, have been the source of many environmental problems. The output products of internal combustion engines cause, for example, smog and other exhaust gas-related problems. Various pollution control measures minimize the amount of certain undesired exhaust gas components. However, these control measures are not 100% effective.

Even if the exhaust gases could be made totally benign, the gasoline based internal combustion engine still relies on non-renewable fossil fuels. Many groups have searched for an adequate solution to these energy problems.

One possible solution is a fuel cell. Fuel cells chemically react using energy from a renewable fuel material. Methanol, for example, is a completely renewable resource. Moreover, fuel cells use an oxidation/reduction reaction instead of a burning reaction. The end products from the fuel cell reaction are mostly carbon dioxide and water.

SUMMARY

A polymeric membrane that is a water-free proton conductor is provided. A membrane, as disclosed, is particularly useful for fuel cells that operate at high temperature. The membrane described herein does not require water for proton conduction and hence overcomes the conductivity and stability issues of state-of-art membranes such as Nafion that cannot operate at temperatures greater than 100° C.

Provided is a polymer electrolyte membrane comprising a quaternized amine salt on a support matrix. The quaternized amine salt may be selected from the group consisting of a poly-4-vinylpyridinebisulfate, a poly-4-vinylpyridinebisulfate silica composite, and a combination thereof. Examples of a support matrix includes a glass fiber matrix, a polybenzoxazole matrix, and/or a polybenzimidazole matrix.

Also disclosed is a methanol fuel cell comprising an anode, a cathode, a proton-conducting membrane, and a pump element, in fluid communication with the anode, wherein the proton-conducting membrane comprises a quaternized amine salt on a support matrix.

The disclosure also provide a proton conducting membrane comprising a quaternized polyvinylpyridine polymer or composite. In one aspect, the proton conducting membrane composite comprises a nanoparticulate oxide. In another embodiment, the proton conducting membrane composite is a poly-4-vinylpyridine bisulfate silica.

Further provided by the disclosure is a method of forming a proton conducting membrane comprising dissolving poly-4-vinylpyridine in a solvent to form a mixture; contacting the mixture with sulfuric acid or phosphoric acid to obtain a precipitate; recovering the precipitate; mixing the precipitate with an aqueous solvent to form a paste; and applying the paste to a support matrix.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
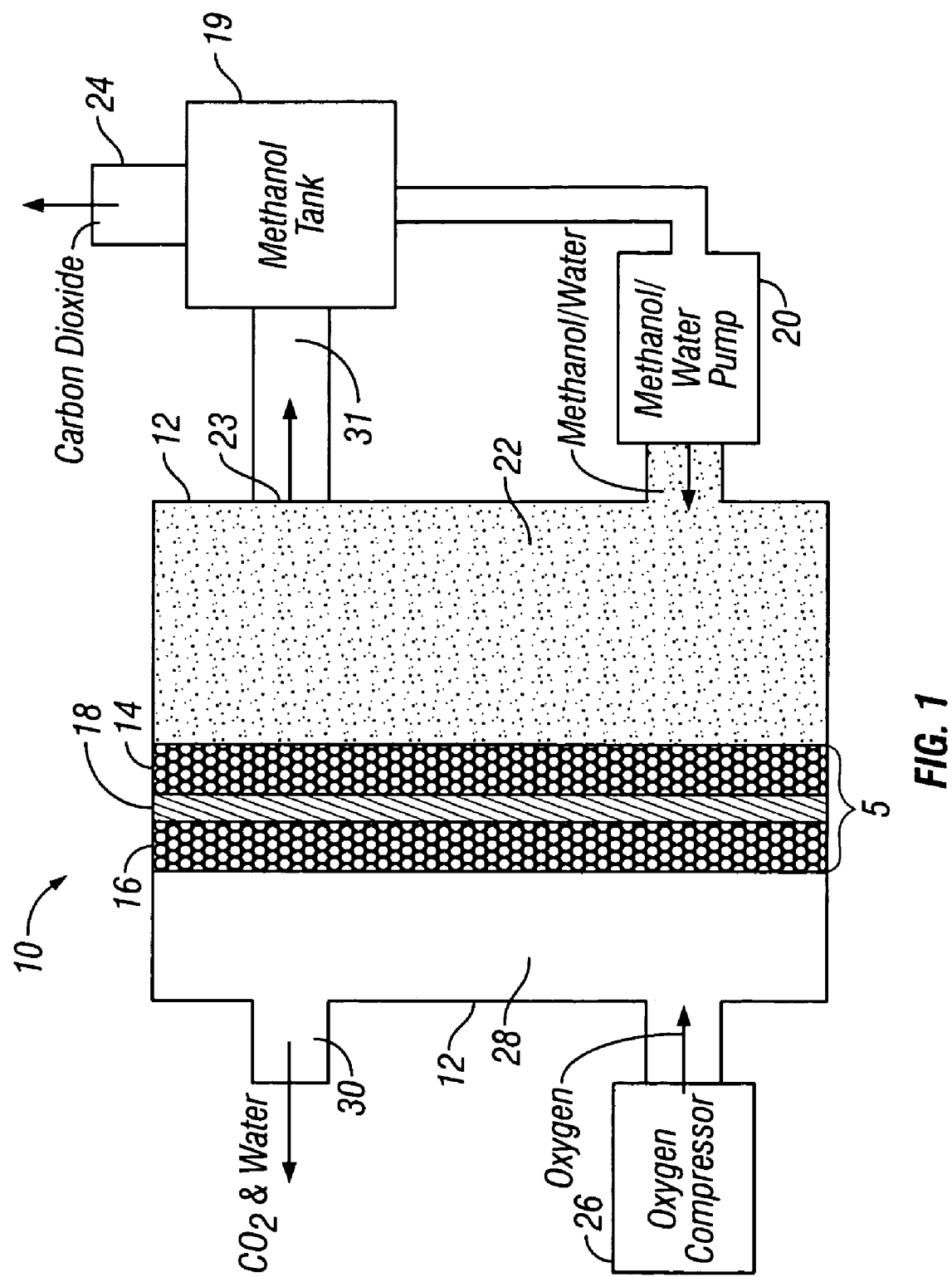
FIG. 1 is a prior art general schematic of a fuel cell.

A polymer electrolyte membrane intended for use in an electrochemical reaction in a fuel cell is disclosed. The membrane is fabricated using quaternized polymeric materials resulting in a water-free system. This resulting membrane functions as an ion exchange electrolyte when used in a fuel cell. The membrane operates at elevated temperatures and improved efficiency.

Fuel cells are promising as power sources. Perfluorinated ionomeric membranes such as Nafion™ have been used in Polymer electrolyte membrane (PEM) fuel cells due to the stability, ionic conductivity and mechanical strength that these polymeric materials offer. This is particularly true for stack operation below 100° C. However, significant benefits of improved cell and system performance are achieved if the operating temperatures are raised above 140° C. For example, by increasing the temperature of fuel cell operation to 150° C., or even as high as 200° C., carbon monoxide tolerance can be enhanced from the current levels of 100 ppm to 10,000 ppm. However, Nafion™ relies on water retentivity, and at temperatures greater than 120° C., the water's retentivity of Nafion-type membranes is poor. Thus, an alternate membrane that retains high conductivity at temperatures as high as 200° C. is needed.

Another type of membrane material used in fuel cells exploits the ionic mobility of protons in free acids such as phosphoric acid, sulfuric acid, or heteropolyacids. These acids are provided in polymer matrices such as polybenzimidazole (PBI) or Nafion to produce an ionically conducting membrane. Although this type of membrane is more resistant to water loss than Nafion, such membranes (i) do not allow efficient/sufficient proton migration, (ii) do not allow for re-distribution of protons, and (iii) are subject to corrosion.

The materials described herein address many of the foregoing problems by, for example, providing a membrane that does not rely on water for proton conduction, operates at higher temperatures, is an efficient transporter of protons, and is resistant to corrosion. The membrane is "water-free" and conducts protons by a reorganization process.

In water proton conducting membranes, protons are transported by free rotation and translation of the molecules in a "vehicle" transport process. In the "water-free" membranes of, protons are transported by cleavage and re-forming of hydrogen bonds in the polymer. Thus, a proton is propagated across a polymer by breaking and reforming of bonds through a mechanism referred to generally as the Grotthuss mechanism. Thus, there are two general mechanisms for proton conductivity: (i) the vehicle mechanism, which relies on the physical transport of a vehicle to move protons and is present in water containing membranes, and (ii) the Grotthuss mechanism, which involves the proton being handed off from one hydrogen bonding site to another. The membranes propagate/transport protons by a Grotthuss-type mechanism.

In one aspect, methods using organic amine salts in highly conducting fuel cell membranes is provided. Also provided are quaternized polymer membranes useful as water-free fuel cell membranes.

A fuel cell is an electrochemical device, which reacts a fuel and an oxidant to produce electricity and water. A typical fuel supplied to a fuel cell is methanol, and a typical oxidant supplied to a fuel cell is oxygen (or ambient air). Other fuels or oxidants can be employed depending upon the operational conditions and type of fuel cell. Further, since fuel cells can be assembled into stacks of various sizes, power systems have been developed to produce a wide range of electrical power outputs and thus can be employed in numerous industrial applications.

A fuel cell produces energy by reacting fuel and oxygen at respective electrode interfaces, which share a common electrolyte. For example, in proton exchange membrane (PEM) fuel cells, the construction includes a proton exchange membrane, which acts not only as an electrolyte, but also as a barrier to prevent the fuel (e.g., methanol) and oxygen from mixing. As should be understood, the proton exchange membrane is positioned between, and in contact with, the two electrodes, which form the anode and cathode of the fuel cell.

In the case of a PEM type fuel cell, methanol is introduced at a first electrode (anode) where it reacts electrochemically in the presence of a catalyst to produce electrons and protons. The electrons are circulated from the first electrode to a second electrode (cathode) through an electrical circuit that couples these respective electrodes. Further, the protons pass through a membrane of solid, polymeric electrolyte (a proton exchange membrane or PEM) to the second electrode (cathode). Simultaneously, an oxidant, such as oxygen gas, (or air), is introduced to the second electrode where the oxidant reacts electrochemically in the presence of the catalyst and is combined with the electrons from the electrical circuit and the protons (having come across the proton exchange membrane) thus forming water. This reaction further completes the electrical circuit.

The reactions of a direct methanol/liquid-fed fuel cell are as follows:
Anode $CH_3OH+H_2O=6H^++CO^2+6e^-$
Cathode $1.5O_2+6H^++6e^-=4H_2O$
Net $CH_3OH+1.5O_2=CO_2+2H_2O$ The external electric circuit conveys the generated electrical current and can thus extract electrical power from the cell. The overall PEM fuel cell reaction produces electrical energy, which is the sum of the separate half-cell reactions occurring in the fuel cell less its internal losses.

FIG. 1 illustrates a general liquid feed organic fuel cell 10 having a housing 12, an anode 14, a cathode 16 and an electrolyte membrane 18 (e.g., a water-free proton-conducting electrolyte membrane). As will be described in more detail below, anode 14, cathode 16 and electrolyte membrane 18 can be a single multi-layer composite structure, sometimes referred to as a membrane-electrode assembly or MEA (depicted in FIG. 1 as reference numeral 5). A pump 20 is provided for pumping an organic fuel and water solution into an anode chamber 22 of housing 12. The organic fuel and water mixture is withdrawn through an outlet port 23 and is re-circulated through a recirculation system which includes a methanol tank 19. Carbon dioxide formed in the anode compartment is vented through a port 24 within tank 19. An oxygen or air compressor 26 is provided to feed oxygen or air into a cathode chamber 28 within housing 12.

Prior to use, anode chamber 22 is filled with an organic fuel and water mixture and cathode chamber 28 is filled with air and/or oxygen. During operation, the organic fuel is circulated past anode 14 while oxygen and/or air is pumped into chamber 28 and circulated past cathode 16. When an electrical load is connected between anode 14 and cathode 16, electro-oxidation of the organic fuel occurs at anode 14 and electro-reduction of oxygen occurs at cathode 16. The occurrence of different reactions at the anode and cathode gives rise to a voltage difference between the two electrodes. Electrons generated by electro-oxidation at anode 14 are conducted through the external load and are ultimately captured at cathode 16. Hydrogen ions or protons generated at anode 14 are transported directly across the electrolyte membrane 18 to cathode 16. Thus, a flow of current is sustained by a flow of ions through the cell and electrons through the external load.

A fuel cell described herein comprises an anode, cathode, and a "water-free" membrane, all of which can form a single composite layered structure.

Figure 2:
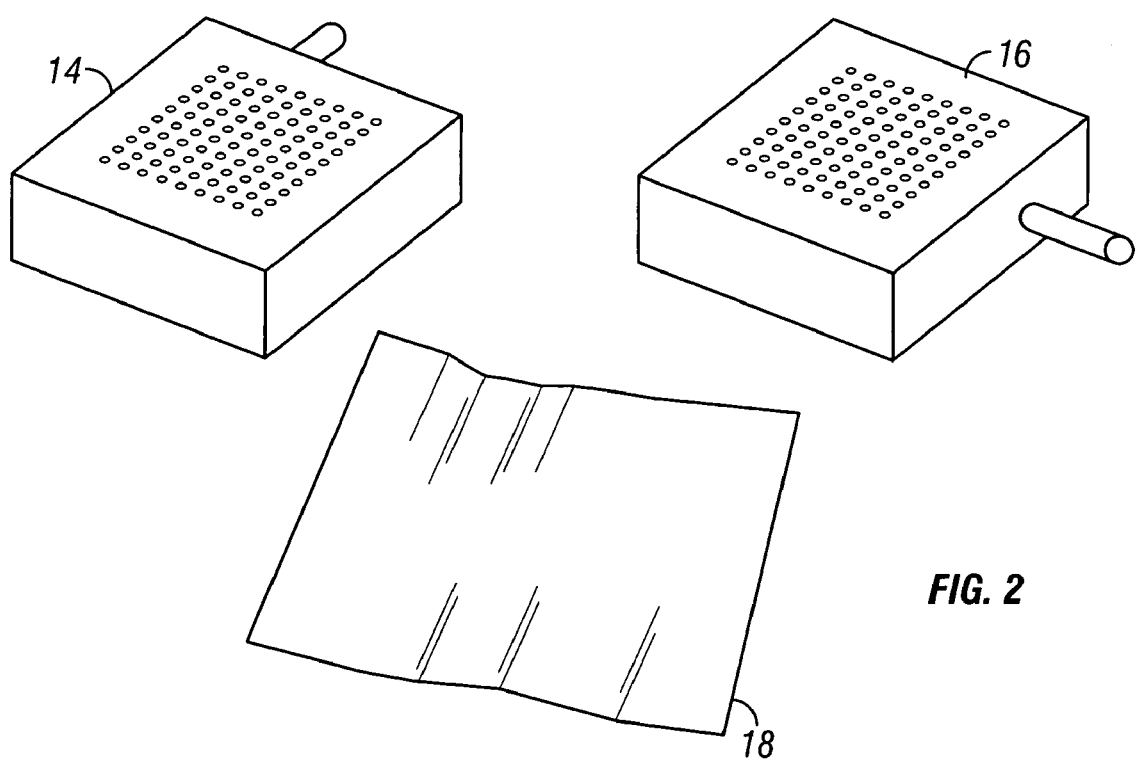
FIG. 2 shows a poly-4-vinylpyridine bisulfate membrane (P4VPBS membrane).

In one aspect, a water-free membrane comprises a combination of a proton conductor with nano-particulate oxides (e.g., silica) and a binding agent (e.g., Teflon®). FIG. 2 is a photograph of membranes 18 (e.g., a triethylenediamine sulfate or poly vinyl pyridinum bisulfate membrane). Also shown in FIG. 2 are fuel cell halves comprising anode chamber 22 and cathode chamber 28 including anode 14 and cathode 16.

Polymeric quaternized amine salts are useful in this regard (see also co-pending and co-owned U.S. Application Publication No. 20030148162, published Aug. 7, 2003). A polymeric salt, endowed with chain flexibility, would overcome the deficiencies of simple organic amine salts that have to melt before being able to conduct protons. The material provides quaternized polymeric materials that are useful in fuel cells and that can withstand elevated temperatures of operation.

A polymeric membrane comprises a base polymer that includes repeating units as discussed herein so as to participate in providing the capacity to effectively separate one or more acids from the one or more other compounds. For example, ampholytic base polymers that are at least about 10% by weight constituted by such identified repeating units are employed, more typically at least about 30% by weight, and most commonly at least about 50% by weight. Other monomeric units in the polymer may be derived, for example, from crosslinking monomers and/or other monomers, which provide characteristics to the overall polymer consistent with its use described herein.

This base polymer is chemically modified to provide ampholytic character to the polymer, e.g. by adding positive and negative ionic groups to repeating units of the resin. For example, a nitrogenous base polymer (e.g. carrying pendant pyridyl or aliphatic tertiary amino groups) can be quaternized to provide a polymer with repeating units, wherein the N-bonded "quaternizing" group carries a negative charge, particularly on an atom, such as an oxygen atom (e.g. as provided by a group—$CO_2^-$, $SO_3^-$, and the like) or a boron atom (e.g. as provided by a group—$B(OH)_3^-$). Nitrogenous polymers may also be N-oxidized so as to carry pendant functions containing the characteristic N-oxide function, $N^+$—$O^-$.

Ampholytic base polymers for use in the methods and compositions described herein are chemically modified, crosslinked pyridine-containing polymers, e.g. crosslinked vinylpyridine polymers such as polyvinylpyridine polymers comprising poly 2- and poly 4-vinylpyridine. These materials are at least about 15% cross-linked with a suitable cross-linking agent, such as divinylbenzene. Most of the materials are chemically modified to be 15 to 50% crosslinked vinylpyridine polymers, e.g. poly 2- and poly 4-vinylpyridine polymers.

Vinylpyridine materials such as those described in U.S. Pat. No. 5,364,963 are prepared by co-polymerizing a vinylpyridine monomer with an aromatic compound having two vinyl groups as a cross-linking agent. Exemplary suitable cross-linking agents are aromatic divinyl compounds such as divinylbenzene and divinyl toluene. Suitable vinylpyridines of the polymer include 4-vinylpyridine, 2-vinylpyridine and 2- and 4-vinylpyridine derivatives having a lower alkyl group such as a methyl group or ethyl group on the pyridine ring. Such vinylpyridine monomers can be used in conjunction with aromatic vinyl monomers such as styrene or vinyl toluene.

Examples of commercially available poly 2- and poly 4-vinylpyridine resins are available from Reilly Industries, Inc., Indianapolis, Ind., under the trade name REILLEX™ polymer series. These REILLEX™ polymers are generally crosslinked with divinylbenzene, and exhibit good thermal stability. Additional resins are available from this same source under the REILLEX™ HP polymer series.

The REILLEX™ polymer materials contain heteroatoms capable of being quaternized with an alkyl halide. Heteroatoms present in the REILLEX™ polymers that are capable of being quaternized with alkyl halides include nitrogen (N), sulfur (S), oxygen (O) and phosphorus (P). The nitrogen atom, for example, is typically part of a pendant free base including tertiary amines, secondary amines, pyridines, or any nitrogen heterocycle group. The nitrogen can be substituted or unsubstituted.

Other commercially available polymers include, for example, AMBERLYST A-21, AMBERLITE IRA 68, or AMBERLITE IRA 93 resins from Rohm and Haas, Philadelphia, Pa., or DOWEX MWA-1 resin from Dow Chemical. The A-21 resin, for example, is crosslinked by divinylbenzene and contains aliphatic tertiary amines (e.g., dialkylamino- or dimethylamino- groups); the IRA 68 resin contains, for example, aliphatic tertiary amine groups, a divinylbenzene-crosslinked acrylic matrix; and the IRA 93 and MWA-1 resins contain aliphatic tertiary amine groups, and are based on a divinylbenzene-crosslinked styrene matrix.

Other types of "water free" proton conducting membranes that incorporate quaternary nitrogen atoms include:
  Type I: Organic tertiary amine bisulfate and hydrogen phosphate;
  Type II: Polymeric quaternized amine bisulfate, triflate or hydrogen phosphate; and
  Type III: Polymeric quaternizable amines combined with Nafion to form an intimate network with ionic interactions.

For Type I materials triethylenediamine bisulfate, triflate and phosphate salts in a fine particulate are combined with nanoparticulate oxides and Teflon®. The combination is then formed into membranes used in fuel cells as depicted in FIGS. 1 and 2. A typical formulation, for example, includes triethylenediamine bisulfate, sulfuric acid, and Teflon. A mixture comprised of the organic amine and Teflon particles in methanol is added drop wise into a solution of sulfuric acid in methanol. As a result, an organic amine bisulfate precipitate is obtained. This salt and the Teflon in suspension are recovered and washed with excess methanol to remove traces of acid and dried in a vacuum oven. The resulting material can be formed into membranes by the use of a roller.

For Type II materials two polymeric systems are possible. First, a condensation polymer poly (1,4-xylenyl) piperazine is quaternized with bisulfate or hydrogen phosphate. A bis-N,N'-(phenyldiemthylsilyl)-derivative of piperazine is condensed with xylenyl dichloride to result in a condensation polymer. The polymer film is then cast from chloroform, and acidified to produce a quaternized membrane. The degree of quaternization can be controlled to achieve appropriate mechanical properties and ionic conductivity.

In a typical preparation, equimolar quantities of phenyidimethyldicholoro silane and piperazine are dissolved in a polar solvent. The condensation polymerization results in formation of hydrogen chloride, which is removed to realize the pure polymer. The polymer is combined with a stoichiometric amount of sulfuric or phosphoric acid to produce a quaternized acid salt. The degree of quaternization can be varied from 10% to 100% by varying the amount of acid used in the reaction. Higher degrees of quaternization are desirable for efficient proton conduction. A hundred fold excess of acid usually results in complete quaternization.

In another aspect, poly-4-vinyl pyridine bisulfate is fabricated. This polymer is prepared by the polymerization of the monomer, 4-vinyl pyridine. The polymerization occurs in polar solvents through ionically-induced reactions initiated by the anion of the salt resulting in the chemical structure shown in Formula I.

Formula I

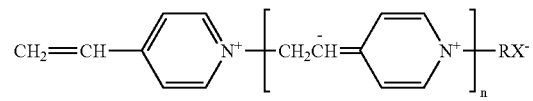

In one embodiment, the poly-4-vinylpyridine is dissolved in methanol and then reacted with an excess of sulfuric acid to precipitate poly-4-vinylpyridine bisulfate. The precipitate is recovered, washed in methanol to remove traces of acid and dried to a white granular solid. The poly-4-vinyl pyridine bisulfate will then be cast into a membrane as described herein. The membrane incorporates the anion in the polymer during synthesis and will not require a separate quaternization step.

Yet another embodiment of a proton conductor comprises poly-4-vinyl pyridinium and poly-2-vinyl pyridinium salts with bisulfate and hydrogen phosphate anions. These anions have an ionizable proton that participates in proton conduction (see formula II).

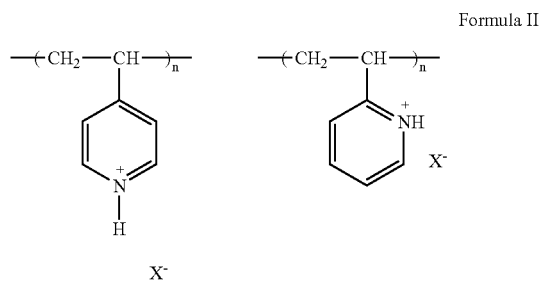

Formula II where X is bisulfate or hydrogen phosphate anion.

In this synthesis the respective polyvinyl pyridine is dissolved in methanol and combined with a hundred fold excess of the acid that can generate the appropriate anion species, for example sulfuric or phosphoric acids. In a typical example 1 gram of polyvinylpyridine is combined with 100 grams of sulfuric acid. This ensures complete quaternization of the nitrogen sites. The resulting precipitate of polyvinylpyridinium salt is washed with excess methanol to remove traces of acid and vacuum dried. To prepare a membrane, a concentrated solution of the polyvinylpyridinium salt is prepared in water and brushed on to a porous inert polymer substrate and allowed to dry. Such porous substrates include glass, polybenzoxazole, aramid and polybenzimidazole. Such a composite membrane structure can then be used as a proton conducting electrolyte.

For Type III materials, the membrane formulation incorporates proton conducting quaternary nitrogen containing polymers with Nafion ionomer to cast a two-component polymer system. This type of formulation takes advantage of the strong acidity of dry Nafion and its flexible polymer backbone. This two-component system increases the number of sites available for proton propagation and allows for additional relaxation and reorganization mechanisms in order to reduce barrier heights during proton transport.

In a typical preparation of the type III material, 1 equivalent of the quaternizable amine containing polymer such as polyvinyl pyridine (equivalence being calculated based on the number of quaternizable nitrogens), and 1 equivalent of the Nafion (the equivalence calculated based on the sulfonic acid groups) is combined in a suitable polar solvent such as dimethyl formamide, n-methylpyrrolidone or methanol to form an adduct. Alternately, excess Nafion as high as 1.5 equivalents can be used. The resulting solution or gel will be cast into a membrane.

In yet another preparation, nanoparticles of silica rich with hydroxyl groups are added to poly-4-vinylpyridine (P4VP) in methanol. The mixture is then reacted with excess sulfuric acid to precipitate a silica composite of P4VPBS-$SiO_2$—$SIO(HSO_4)_2$.

As discussed above, the granular solids (as well as the silica composite) are redissolved in water to create a gluey turpid solution (paste). The ratio of polymer salt to water can be varied to arrive at a desired consistency, but will typically be about 50:50 mix. The paste is then brushed onto a matrix support material. Examples of suitable matrix support materials include a glass fiber matrix, polybenzoxazole matrix, and polybenzimidazole matrix. The polymer coating is allowed to dry on the matrix support at approximate 60° C. with forced hot air for bout 1 hour. Further drying may be carried out in a drying oven at 60° C. if desired.

EXAMPLES

Poly-4-vinylpyridine (P4VP) having a molecular weight of 160,000 was used as a starting material. Using such a high molecular weight material is useful in preparing membranes. Lower molecular weight materials generated brittle membranes.

P4VP was dissolved in methanol and then reacted with an excess of sulfuric acid to precipitate P4VP bisulfate (P4VPBS). The precipitate was recovered, washed several times with methanol to remove traces of acid, and dried to a white granular solid.

P4VP was also mixed with nanoparticle silica, rich with surface hydroxyl groups. This mixture was reacted with excess sulfuric acid to precipitate a silica composite of P4VPBS-$SiO_2$—$SiO(HSO_4)_2$. The silica composite has higher proton conductivity because of the additional groups that were available for forming hydrogen bonds. The granular solids, P4VPBS or the silica composite, were then redissolved in water to crate a gluey turbid solution. The ration of polymer salt to water in this suspension can be varied, but an approximately 50:50 mix is considered manageable for further processing.

The gluey mix (paste) was then brushed on to an open glass fiber matrix that was in the form of a thin mat. Other matrices such as polybenzoxazole or polybensimidzole are also acceptable. The polymer coating was then allowed to dry at 60° C. with forced hot air from a blower for about 1 hour. Further drying of the membrane to remove traces of water was carried out in a vacuum oven set at 60° C.

Figure 3:
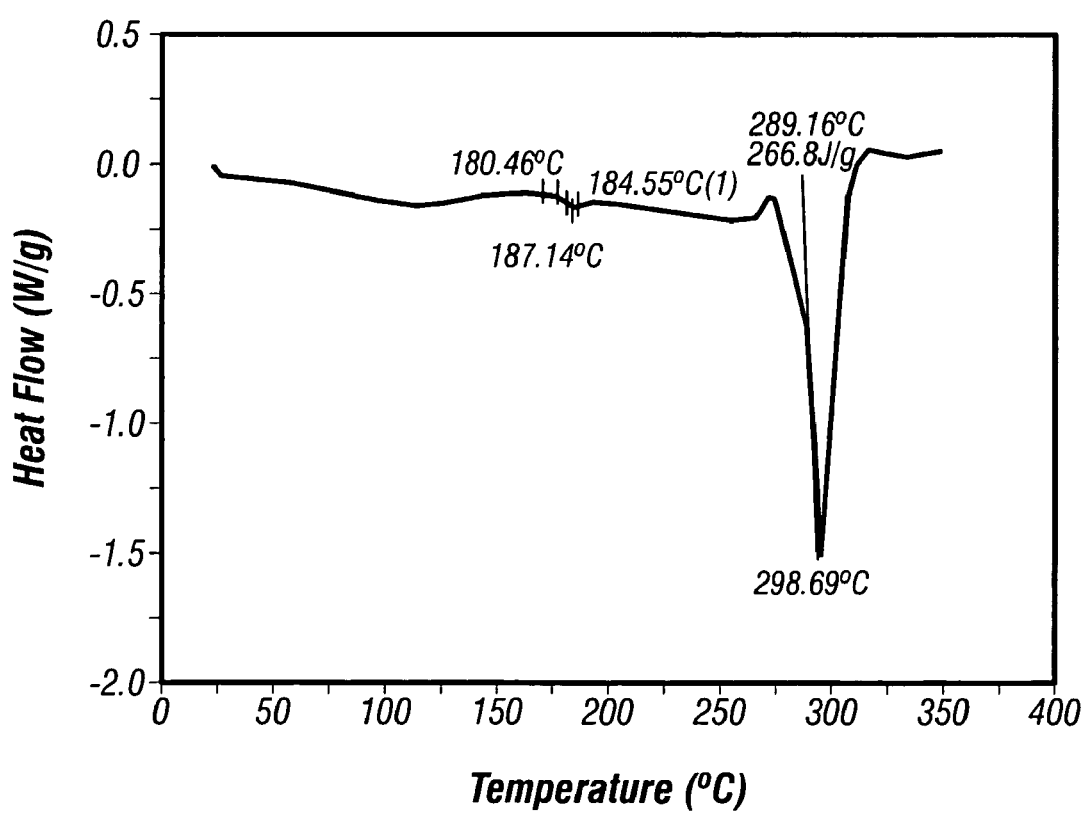
FIG. 3 is a plot showing differential scanning calorimetric data for a P4VPBS membrane.

The thermostability of the P4VPBS material was evaluated by differential scanning calorimetry. The results shown in FIG. 3 indicate that the polymer undergoes a glass transition at about 182° C. and melts at about 298.7° C., with no evidence of decomposition. These thermal properties are consistent with the stability requirements for fuel cell operation.

Figure 4:
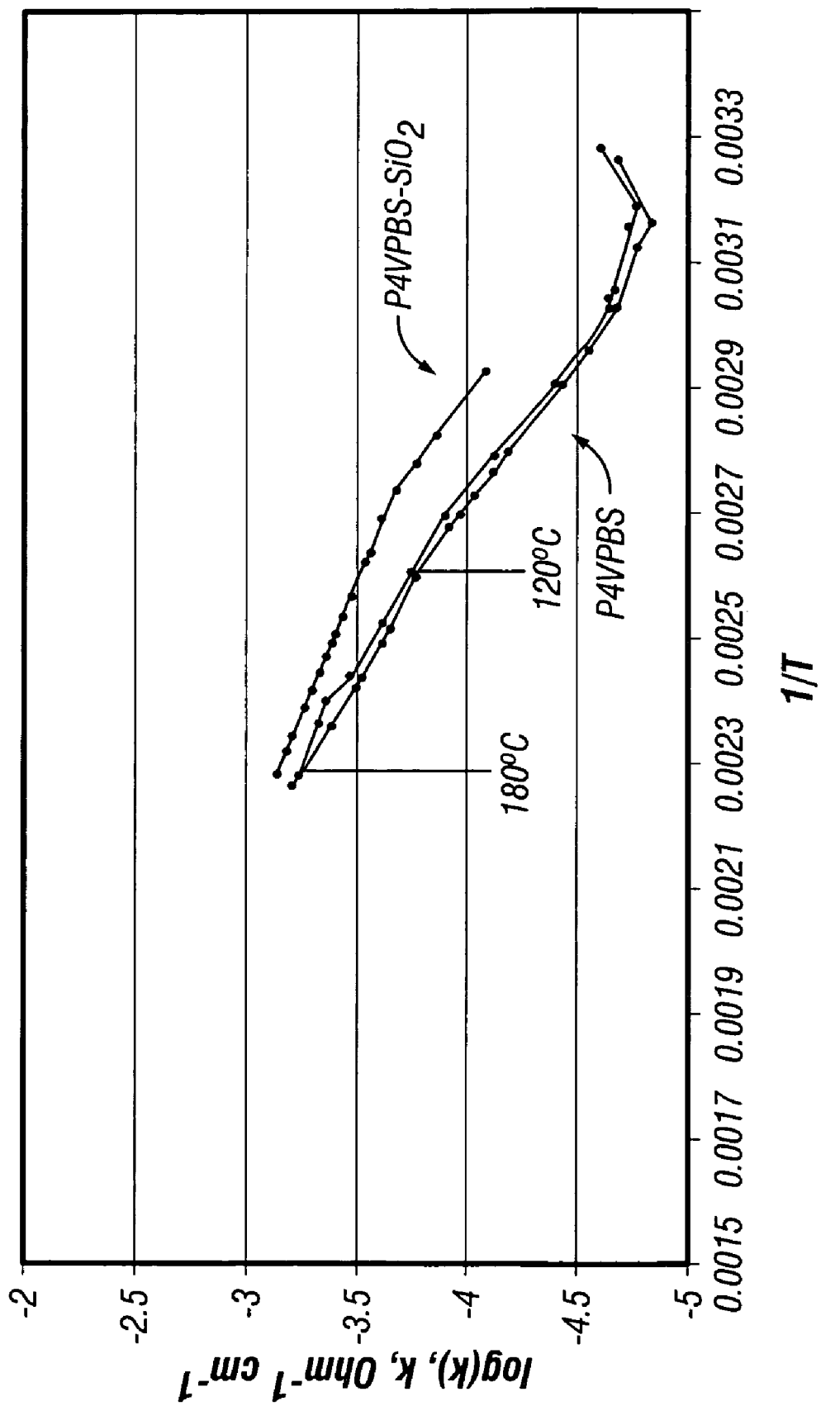
FIG. 4 is a plot showing ionic conductivity of P4VPBS and P4VPBS-Silica composite as a function of temperature.

The membrane conductivity of both the P4VPBS and the P4VPBS-silica composite was measured. The results are shown in FIG. 4. The membranes have a conductivity of about $6 \times 10^{-4}$ Ohm$^{-1}$cm$^{-1}$ at about 180° C. The silica composite has a slightly higher conductivity compared with the P4VPBS. The activation energy for conduction is about 0.1 eV, suggesting hopping type conduction through hydrogen bonds. While the conductivity values are two orders of magnitude lower than desirable for fuel cell applications, such solid-state proton conduction in polymeric salts is the highest observed so far. Further design and modification of the polymer backbone to facilitate hydrogen bond formation and more sites for proton hopping would result in enhancement of conductivity values.

Figure 5:
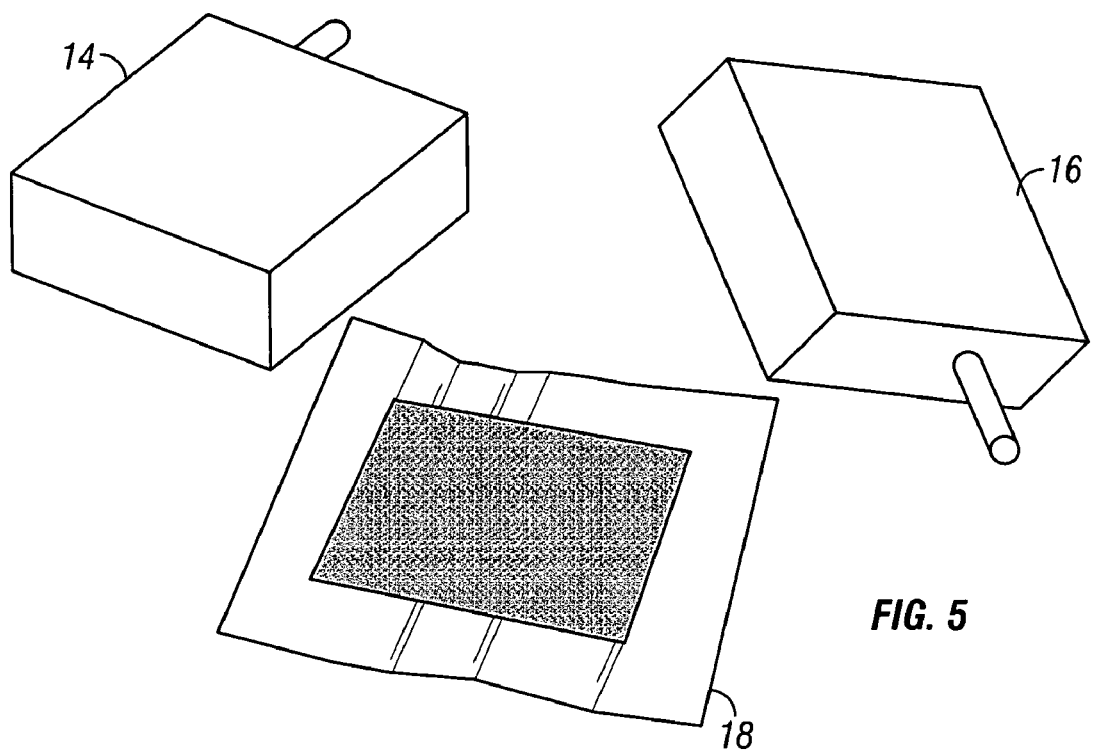
FIG. 5 depicts a membrane-electrode assembly fabricated from a P4VPBS-silica composite membrane.

In order to verify that the ionic conductor was indeed the proton, the membrane was deployed as an electrolyte in a hydrogen-oxygen fuel cell. The fuel cell consisted of a membrane electrode assembly fabricated with catalyzed electrodes 14 and 16 on either side of the membrane 18 as shown in FIG. 5.

The cathode was prepared by applying catalyst layers consisting of P4VPBS and fuel cell grade platinum catalyst.

The anode side of the catalyst layers were prepared by combining the phosphate salt of P4VP with platinum catalyst, and later covering the catalyst layer with a layer of P4VP-phosphate. Upon supplying hydrogen and oxygen to the cathode and anode, a stable cell voltage of 0.85 V was attained. This suggested electrode potentials appropriate to the fuel cell reactions were being established at both electrodes and that the membrane electrolyte does behave as a proton conductor. Deviations from the highest anticipated value of cell voltage of 1.0 V is attributed to some crossover of hydrogen and oxygen through the membrane.

Figure 6:
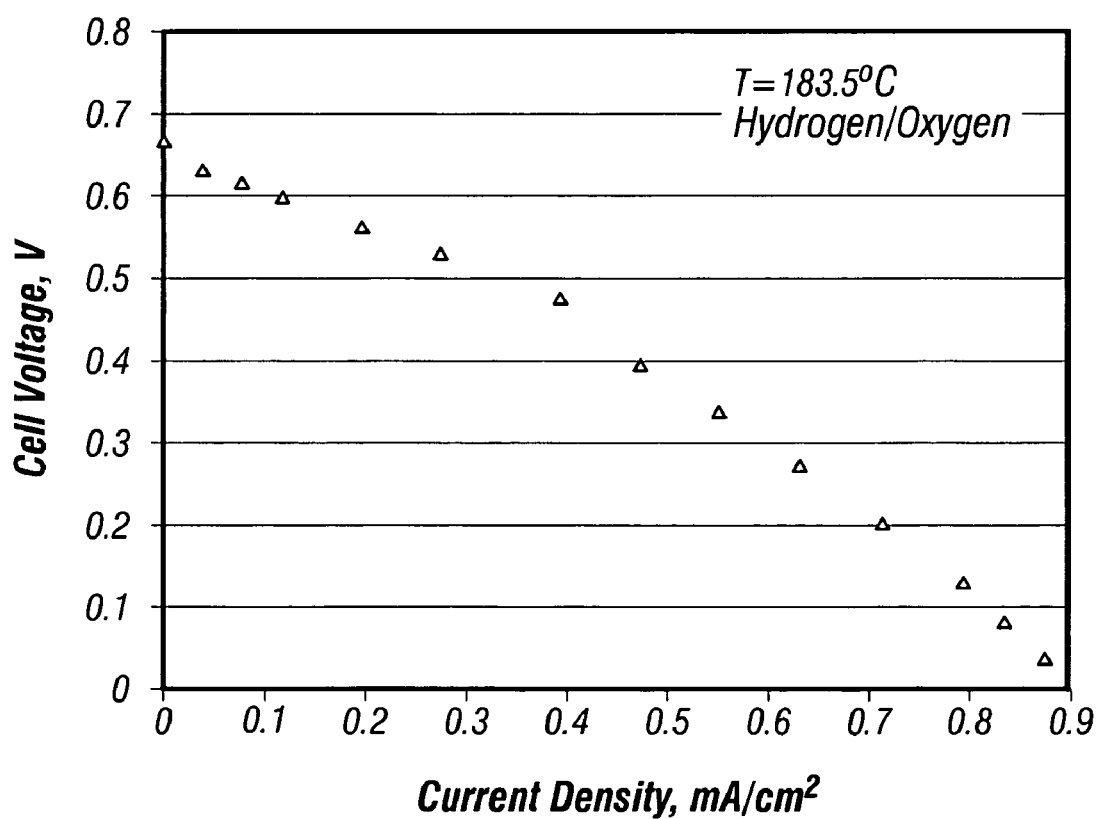
FIG. 6 is a plot showing the performance of a P4VPBS-silica composite in a hydrogen oxygen fuel cell.

The performance of such a membrane electrode assembly with un-optimized catalyst layers is shown in FIG. 6. The power density of the fuel cell operating at 180° C. is quite low because of the un-optimized catalyst layers and probably the higher resistance of the phosphate salts used in the catalyst layers.

The results demonstrate that a proton-conducting polymer salt membrane system operating at high temperatures without water is feasible. With enhancements in conductivity and optimized catalyst layers a viable high-temperature fuel cell can be realized based on such polymeric water-free proton conductors.

A number of embodiments have been described. Nevertheless, it will be understood that various modifications may be made without departing from the spirit and scope of the description. Accordingly, other embodiments are within the scope of the following claims.

What is claimed is:

1. A fuel cell comprising an anode and a cathode, wherein said fuel cell is a liquid-feed fuel cell and having a polymer electrolyte membrane comprising a quaternized amine salt on a support matrix wherein the polymer electrolyte membrane is disposed between the anode and cathode.

2. The polymer electrolyte membrane of claim 1, wherein said fuel cell is a direct methanol fuel cell.

3. A polymer electrolyte membrane comprising a quaternized amine salt on a support matrix, wherein the quaternized amine salt is selected from the group consisting of a poly-4-vinylpyridinebisulfate, a poly-4-vinylpyridinebisulfate silica composite, and a combination thereof.

4. A polymer electrolyte membrane comprising a quaternized amine salt on a support matrix, wherein the support matrix is selected from the group consisting of a glass fiber matrix, a polybenzoxazole matrix, and a polybenzimidazole matrix.

5. A methanol fuel cell comprising:
   an anode;
   a cathode;
   a polymer electrolyte membrane comprising a quaternized amine salt on a support matrix and a proton-conducting membrane formed from said quaternized amine salt on a support matrix; and
   a pump element, in fluid communication with the anode.

6. The fuel cell of claim 5, wherein the fuel cell uses methanol.

7. The fuel cell of claim 5, which is a direct methanol fuel cell.

8. The fuel cell of claim 5, wherein the quaternized amine salt is selected from the group consisting of a poly-4-vinylpyridinebisulfate, a poly-4-vinylpyridinebisulfate silica composite, and a combination thereof.

9. The fuel cell of claim 5, wherein the support matrix is selected from the group consisting of a glass fiber matrix, a polybenzoxazole matrix, and a polybenzimidazole matrix.

10. A polymer electrolyte membrane comprising a quaternized amine salt on a support matrix, wherein said amine salt is quaternized polyvinylpyridine polymer or composite.

11. The proton conducting membrane of claim 10, wherein the composite comprises a nanoparticulate oxide.

12. The proton conducting membrane of claim 11, wherein the composite is a poly-4-vinylpyridine bisulfate silica.

13. The proton conducting membrane of claim 10, wherein the quaternized polyvinylpyridine is poly-4-vinylpyridine bisulfate.

* * * * *